March 15, 1960 F. L. COOKE 2,929,027
AMPLIFIER INCLUDING HUM ELIMINATION CONTROL MEANS
Filed April 20, 1945
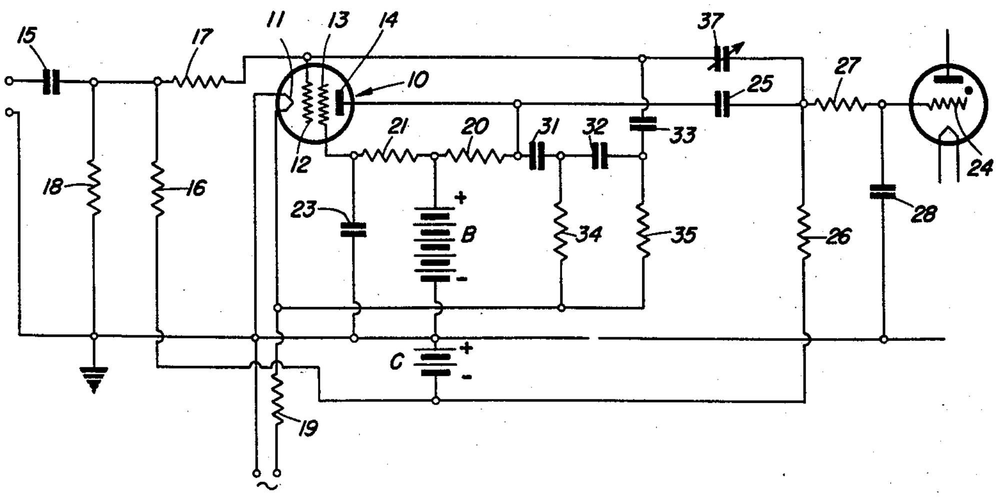
INVENTOR
FINLEY L. COOKE
BY Ralph L Chappell
ATTORNEY

United States Patent Office 2,929,027

Patented Mar. 15, 1960

2,929,027

AMPLIFIER INCLUDING HUM ELIMINATION CONTROL MEANS

Finley Lamar Cooke, Washington, D.C., assignor to the United States of America as represented by the Secretary of the Navy Application April 20, 1945, Serial No. 589,442

1 Claim. (Cl. 330—107)

(Granted under Title 35, U.S. Code (1952), sec. 266)

This invention relates to electron tube circuits, and particularly to improved means for controlling or stabilizing the operation thereof.

An important object of the invention is to provide such a system adapted to be used with vacuum tubes having filamentary cathodes directly heated by alternating current, the invention being designed to reduce markedly the tendency of the alternating current filament supply to produce a ripple or hum in the output circuit.

A further object of the invention is to provide such a hum reducing means which is very compact and simple and which is adapted to be incorporated in small and easily portable apparatus.

Still another object is to provide such a system which is adapted to be used in amplifying systems and which reduces the hum or ripple effect of alternating current filament supply without reducing the signal gain of the amplifier.

Other objects will be apparent upon consideration of this disclosure in its entirety.

The single figure of drawing is a schematic diagram of a regenerative amplifier incorporating the principles of the present invention.

Referring now to the drawing, the diagram illustrates a complete electronic amplifier of the type employed to amplify a relatively weak input signal and to apply an amplified output signal to an electronic relay, together with its associated input signal coupling circuit and output signal coupling circuit to the electronic relay. The amplifier comprises an electronic tube of the tetrode type indicated generally at 10, having a conventional filament 11, control grid 12, screen grid 13, and anode 14. An input signal to be amplified is translated to the control grid through a coupling condenser 15 and grid leak resistor 16, and a series resistor 17 connected to the junction of resistor 16 and capacitor 15. The control grid is provided with bias from an appropriate source indicated at C. The filament is heated by alternating current from a source (not shown) which may comprise a 1000 cycle supply connected at the point ~, and a resistor 19 is serially included. The anode and screen grid are coupled to an appropriate source of space current indicated generally at B through plate load resistor 20 and screen voltage dropping resistor 21, respectively. A condenser 23 is provided, to by-pass screen 13 for high-frequency voltages. The amplified output signal is translated to the control electrode 24 of a "Thyratron," or the like, included in an electronic relay, by a coupling network comprising a capacitor 25, resistor 26, and series resistor 27 connected to the junction of capacitor 25 and resistor 26. The "Thyratron" is normally biased by the source C coupled to resistor 26. Capacitor 28 is connected between grid 24 and the ground. The above-described components and the operation thereof are well known to the art so that further description thereof is deemed unnecessary.

The amplifier includes circuit arrangements for attaining a high response at a predetermined narrow band of frequencies, so as to cause the "Thyratron" tube to be triggered in response to input signals of that frequency, and for so determining the gain of the complete amplifier with its associated coupling network that, for a given input signal magnitude, the output signal applied to the "Thyratron" control electrode may be regulated to conform to a specified standard, permitting a wide and controllable variation of gain of the amplifier. This means, which is disclosed in detail in the copending application of Robert D. Huntoon, Serial No. 601,680, filed June 26, 1945, entitled Gain Control Circuit, includes a frequency selective phase-shifting attenuating network coupled to anode 14 and including series capacitors 31, 32, 33, the remote terminal of capacitor 33 being connected to grid 12. The feedback to the control grid through condensers 31, 32, 33 is regenerative at the operating frequencies.

Also coupling the output circuit of tube 10 to its control grid is a variable gain control capacitor 37 connected to the terminal of capacitor 25 remote from tube 10 and comprising a degenerative feedback path.

The degenerative feedback thus opposes the regenerative effect of the feedback through condensers 31, 32, 33, and by adjustment of condenser 37 the effective regenerative action may be varied to afford effective control of the overall gain of the amplifier as brought out in the aforementioned copending application.

It will be observed that the resistors 34, 35, which may be considered as a part of the regenerative feedback network above mentioned, are returned to the ungrounded side of the filament 11 rather than to the grounded side or to a center tap, as would be considered more conventional. The hum reducing advantages of this arrangement in such a combination as that disclosed are not immediately apparent, but may be explained as follows: The hum or ripple component of the feedback voltage is 180° out of phase with the alternating current filament supply. The A.C. filament supply gives rise to an apparent signal. Network 31, 32, 33, 34, 35 feeds back the objectionable hum voltage from the plate 14 to grid 12 and cancels off in the grid circuit a large percentage of the unwanted signal arising there from A.C. filament operation. There remains a relatively small but undesirable hum voltage in the output circuit 26, 27, etc., however, and a considerable portion of this remaining hum voltage is canceled off by a portion of the filament voltage which is coupled into the output circuits in such a phase relationship as to effect such cancellation by the connection of the ungrounded end of the filament 11 to the common junction 34, 35. The net effect is that the phase shift circuit through its associated feedback removes most of the objectionable hum, and the small voltage picked up from the ungrounded end of the filament serves to further reduce the hum to an acceptable value. The effect in the output circuit of the alternating voltage drop in the filament at the fundamental filament supply frequency is thus effectively offset, but the double frequency effects arising from temperature variations of the cathode and the magnetic effect of the alternating filament current on the space current are not appreciably altered. The double frequency hum can be kept at a low level by the design of the tube, however. The preferred system illustrated is designed for 1000 cycle filament supply, and has been found to reduce the residual hum level by a factor of about four, or from a level of about 200 millivolts peak at grid 24 without this system to a level of approximately 50 millivolts when the invention is employed.

While there has been shown and described what is at present considered to be the preferred embodiment of this invention, it will be obvious to those skilled in the art that various changes and variations may be made therein without departing from the invention, and it is, therefore, aimed in the appended claims to cover all such changes and modifications as fall within the true spirit and scope of the invention.

The invention herein described may be manufacture and used by or for the Government of the United States of America for governmental purposes without the payment of any royalities thereon or therefor.

I claim:

An electronic amplifier comprising a thermionic electron tube having an anode, a control electrode and a filamentary cathode, a pair of terminals for said cathode, an input circuit for said tube connecting said cathode and control electrode, and an output circuit for said tube connecting said anode and said cathode, a source of alternating current for heating said cathode to emission temperatures, means connecting said source directly to said terminals, a phase shifting network forming a regenerative feed-back path connected between said input and output circuits, means connecting one of said terminals directly to ground, and means connecting the other of said terminals to said phase shifting network whereby the alternating voltage drop in the filament will be applied to said input and output circuits in such phase relation effectively to prevent the variation of voltage of one end of the filament relative to grid from appearing as an amplified signal in said output circuit.

References Cited in the file of this patent

UNITED STATES PATENTS 1,975,834 Duncan ---------------- Oct. 9, 1934